United States Patent [19]

Foote et al.

[11] 4,013,894
[45] Mar. 22, 1977

[54] SECURE PROPERTY DOCUMENT AND SYSTEM

[75] Inventors: Francis C. Foote, Rocky River; Charles K. Beck, Mentor, both of Ohio

[73] Assignee: Addressograph Multigraph Corporation, Cleveland, Ohio

[22] Filed: May 27, 1975

[21] Appl. No.: 581,351

[52] U.S. Cl. .......... 250/569; 235/61.7 B; 235/61.12 R; 235/61.12 M; 250/555; 340/149 A

[51] Int. Cl.² .......... G06K 19/08

[58] Field of Search .......... 250/555, 556, 569, 271; 340/149 A; 235/61.7 B, 61.12 R, 61.12 M; 356/71; 40/2.2

[56] References Cited
UNITED STATES PATENTS

| | | | |
|---|---|---|---|
| 3,700,862 | 10/1972 | Snook | 235/61.12 M |
| 3,761,683 | 9/1973 | Rogers | 340/149 A X |

Primary Examiner—Eugene La Roche
Attorney, Agent, or Firm—Sol L. Goldstein; Harry M. Fleck

[57] ABSTRACT

A secure property document and system are provided which prevents the use of fraudulent credit cards and other documents. The documents each include optical and magnetic data sets. Each data set contains data elements having a spacial relationship to at least some of the data elements contained in the other data set. The system reads and processes the data to determine whether or not the spacial relationship corresponds to that recorded for the particular document. If the spacial relationship codes do not agree within predetermined limits, the document is rejected by the system, whereby the transaction may be refused or additional information requested from the document holder.

35 Claims, 10 Drawing Figures

SECURE PROPERTY DOCUMENT AND SYSTEM

BACKGROUND OF THE INVENTION

The present invention is generally related to credit cards, and more particularly, to a secure property system which prevents the use of counterfeit credit cards and other documents.

In the past, various credit card structures and schemes have been proposed for preventing or avoiding fraud involving credit card transactions or the like. The types of fraud most often encountered may be categorized into two groups:

1. Credit card alteration, duplication and counterfeiting: and
2. Unauthorized use of a valid credit card, as in the case of a lost or stolen card.

The problems presented by unauthorized use have been alleviated to some extent through the use of personal identification procedures and insurance programs which limit the liability of the card owner.

On the other hand, it has proven more difficult to cope with credit card alteration and counterfeiting. The problem may become more serious as criminal elements continue to improve upon counterfeiting techniques, such as "skimming", which can be used to produce counterfeits both quickly and inexpensively. Cards are used more and more each day for transactions such as retail purchases, auto rentals, travel expenses, cash dispensing, and, most recently, electronic funds transfer. Many of these transactions involve large sums of money which presents an even greater inducement for criminal elements to counterfeit credit cards to defraud merchants and the like. It has been apparent that if the use of credit cards and like documents is to continue to grow in the business world, an adequate solution must be provided to this problem.

In recent years, credit card structures have been proposed with invisible codes or the like, which are used to distinguish counterfeits from authentic cards. For example, U.S. Pat. No. 3,468,046 issued to MAKISHAMA et al discloses a card structure bearing normally invisible indicia which may be read under ultraviolet light. The indicia includes the card holder's signature which may be compared by the merchant with the customer's signed receipt or existing account records. This provides some degree of assurance that the person presenting the card is the true owner. However, it would not be difficult for a forger to duplicate the signature or to produce counterfeit cards by selecting appropriate filter material and fluorescent signature panels.

The use of infrared reflection and transmission for secrecy purposes has also been proposed. U.S. Pat. No. 3,829,660, issued to A. Furahashi, discloses a computer information card structure containing infrared reflective areas defined by adjacent IR absorbent ink, or alternately infrared transmissive holes. The ink and holes are concealed against visible detection by light top and bottom laminates of opaque material. This patent does not address itself specifically to the question of credit card security but rather computer card secrecy. If, in fact, the teachings were applied to credit cards, such would not provide a high degree of security as counterfeiting would merely involve dismantling of the card laminates to reveal the ink or holes which define the data.

U.S. Reissue Pat. RE No. 28,081 in the name of J. E. Travioli discloses a credit card structure including a pattern of infrared radiation transmitting holes. The hole pattern is read and resultant signals which identify the card are used to check the account's credit status through a central processor. The patent is not directed to the use of the infrared radiation pattern to determine the authenticity of the card. Furthermore, the card structure is such that a counterfeiter could easily reproduce the hole pattern by the use of data gained by disassembling the card.

SUMMARY OF THE INVENTION

The secure property and system of the present invention provide a solution to the problem of credit card counterfeiting. The document structure contains a pair of data sets containing elements with a unique spacial relationship therebetween which is highly difficult to duplicate on another card. Preferably, during the manufacturing process, the spacial relationship is produced randomly within predetermined limits. The two data sets are subsequently read to provide a security number, which is inputted to an encryption algorithm. The algorithm output defines a secure property (SCP) field or word, which in a typical system, is stored at a central processing system (CPU), with the memory location corresponding to that of an account number or other appropriate identification. Alternately, the SCP field may be stored on the card as a portion of a magnetic data set.

When the card is used for a transaction it is introduced into the system which makes observations upon the data sets. Data representing these observations are transmitted to the point in the network where validation is to take place. If the secure property field or word referenced above has been stored in a data set on the document, it too may be transmitted. If the secure property field or word referenced above has been stored in a file in correspondence with an account number or appropriate identification, it must be fetched. Data representing observations upon the data sets along with the secure property field or word referenced above are presented to an algorithm. If the result of processing the observational data substantially within limits agrees with the secure property field or word, the system accepts the card as being authentic. If the results of this comparison do not agree as required, the system indicates that the card may have been altered, duplicated or counterfeit, in which case the system operator may refuse to accept the card or may request additional information from the card presentor. The validation function may be accomplished at any point in a system capable of receiving the observational data from terminal equipment and capable of receiving the secure property field or word either from data transmitted by the terminal or from a file into which the secure property field or word has been written in correspondence with identifying data.

The document is constructed with one of the data sets comprising magnetic data recorded on a magnetic stripe. The second data set takes the form of an optical data track comprising a plurality of radiant energy modifying elements located beneath the magnetic stripe. In one form of the invention, these elements are comprised of vapor deposited aluminum areas which reflect infrared radiation through the magnetic stripe. The document is further provided with a concealing layer of material, such as ink containing a large percentage of carbon, which underlies the reflective elements and is opaque to visible radiation. Since the reflective elements are concealed on both sides, it is highly difficult to determine and reproduce the exact size and positions of the reflective elements by photographic techniques or the like. Furthermore, the nature of the reflective elements within the document and their bond to adjacent components is such that they may not be exposed or removed in tact by dismantling the document without distorting their interspacial relationships or spacial relationship to the magnetic data.

It is an object of the present invention to provide a versatile secure property comprising two data sets which are spacially related to each other in a manner which is substantially unique to the document and highly difficult to reproduce on a counterfeit document.

Another object of the present invention is to provide a novel secure property including a magnetic stripe containing a first data set and a plurality of radiant energy modifying elements defining a second data set having a substantially unique spacial relationship to magnetic flux changes within the first data set.

A further object of the present invention is to provide a versatile document security system comprising means for reading and processing both magnetic and optical data from a document to determine if the spacial relationship data agrees with that previously assigned to the particular document or associated account number.

DESCRIPTION OF THE PREFERRED EMBODIMENT

Figure 1:
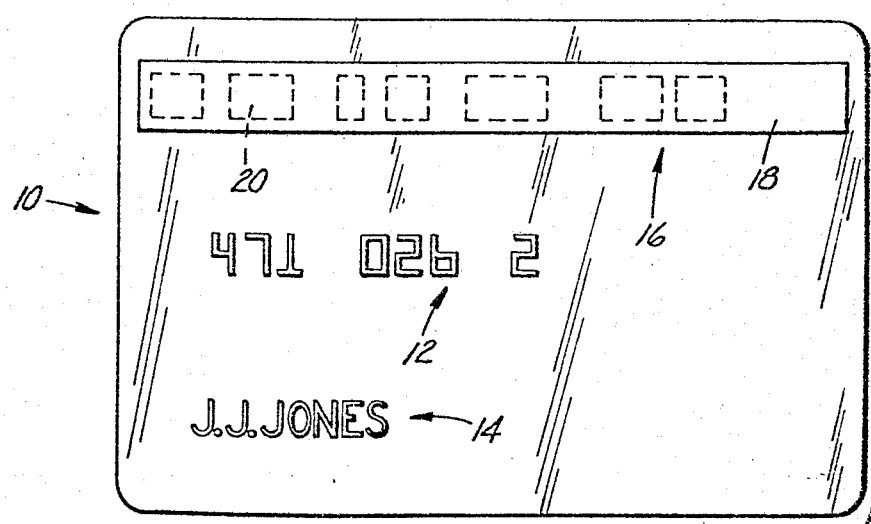
FIG. 1 is a top plan view of a typical document including the secure property of the present invention.
Figure 2:
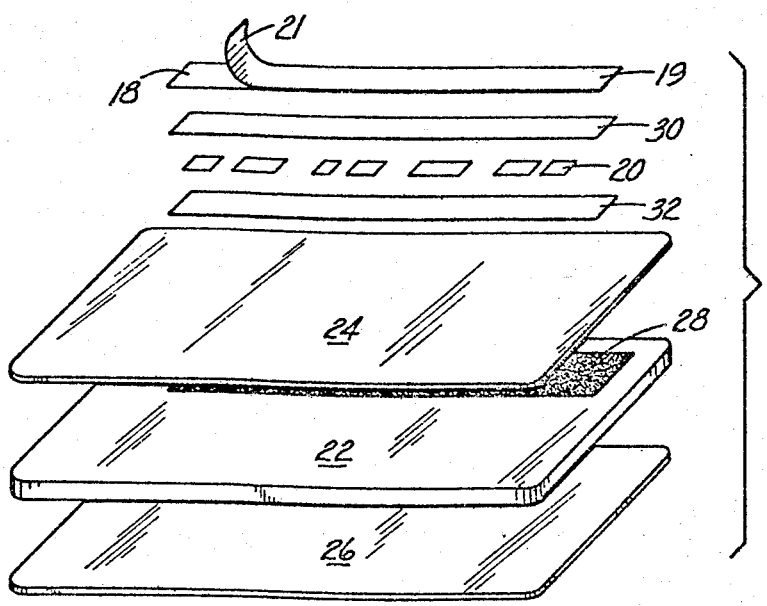
FIG. 2 is an exploded perspective view of the document illustrated in FIG. 1.

Referring now, more particularly, to FIGS. 1 and 2 of the drawings, the secure property document associated with the present invention is generally indicated by the numeral 10 and may include embossed data defining the account number and card holder's name as indicated at 12 and 14, respectively. The embossed data may be read by conventional embossed character readers and in a typical operation would be utilized to imprint sales receipt forms or the like.

The document is further provided with optical and magnetic data sets which reside in an area near the top edge of the card; this area being generally indicated by the numeral 16. In the preferred embodiment, the document is similar, if not identical, in appearance to a conventional magnetic strip-type card, with magnetic data residing within an elongated generally rectangular area 18. The magnetic stripe may contain a plurality of magnetic data tracks, including TRACK 1 and TRACK 2 which meet the standards of ANSI X4.16-1973. Preferably, TRACK 1 would contain account number and identifier information while TRACK 2 would contain additional information normally not rewritten. A third track (TRACK 3) may be provided containing information which is often updated or changed as the card is used in transactions. Such information typically might include account balance, frequency of usage data, and date cycle information. Of course, it is not intended that the magnetic stripe alone comprise a part of the secure property of the present invention and it is recognized that many additional tracks may be provided for other applications.

The secure property is defined in part by an optical data set lying within data area 16 and comprised of a plurality of radiant energy modifying elements 20 which underlie magnetic stripe 18. The radiant energy modifying elements are comprised of reflectors which are preferably vapor deposited and reflect incident radiant energy, particularly in the infrared range. A more detailed description of the vapor deposited reflectors, and the associated method of manufacture is contained in copending U.S. Pat. application entitled Secure Property Document and Method of Manufacture, filed concurrently with the present application and assigned to the assignee of the present invention. It is not intended that the secure property and system of the present invention be limited to the use of vapor deposited reflectors, as various materials such as foil and aluminum paint may be utilized to define the optical data set, hereinafter described.

Referring now, more particularly, to FIG. 2, it will be appreciated that the main body of the document is comprised of three polyvinyl chloride (PVC), or polyvinyl chloride acetate, layers 22, 24 and 26 laminated together. Center layer 22, commonly referred to as the core stock, preferably contains pigments and plasticizers and has a matte finish. The top and bottom laminants 24 and 26 are smooth, thin, clear sheets, which are adhered to the core stock by conventional techniques and may be provided with colored areas and readable indicia. Alternately, the colored areas and indicia may be on center layer 22. It is foreseeable that laminant layers 24 and 26 may be eliminated from the main body structure, if desirable. Preferably, during manufacture, the top or bottom surface of the core stock is provided with a shielding layer 28 which is generally opaque to the transmission of radiant energy. The magnetic stripe media 18 may be formed by a conventional hot stamp process. This involves the application of a magnetic tape 19 over the top laminant through the application of heat and pressure, and subsequent stripping away of the polyester commonly indicated by the numeral 21. An appropriate adhesive, indicated by the numeral 32, is applied to the tape and/or top laminant prior to hot stamping. A coating 30 of appropriate material described in the above referenced application may be applied to the magnetic medium side of the tape to define an optically smooth surface for the vapor deposited elements, if such are utilized as reflectors.

Figure 3:
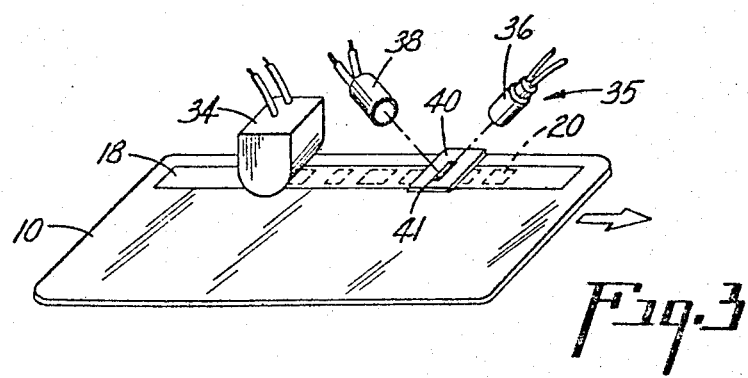
FIG. 3 is a simplified perspective view of the secure property document in conjunction with optical and magnetic readers.

FIG. 3 is a simplified diagrammatic illustration of a typical reader assembly which may be utilized with the secure property document of the present invention. The assembly includes a conventional magnetic read head 34 mounted in a predetermined spacial relationship to an infrared detector generally indicated by numeral 35, including a source of infrared radiation 36 and a detector 38. Preferably, a shield member 40 is provided which overlies a portion of the card and is provided with a narrow slit 41 through which a beam of infrared radiation passes to penetrate the magnetic medium which is sensed by detector 38 after reflection by an element 20 and passing back through the magnetic medium. As the card or document is transported by appropriate means, not illustrated, magnetic data is provided by read head 34 and optical data representative of the reflective elements 20 is provided by sensor 38. There are various commercially available infrared sensors and sources which may be utilized. One such suitable detector is of the PbS type sold by Optoelectronics, Inc. as the OE-20 series. This detector is highly sensitive to radiation of 1-3 microns in wavelength.

Figure 4:
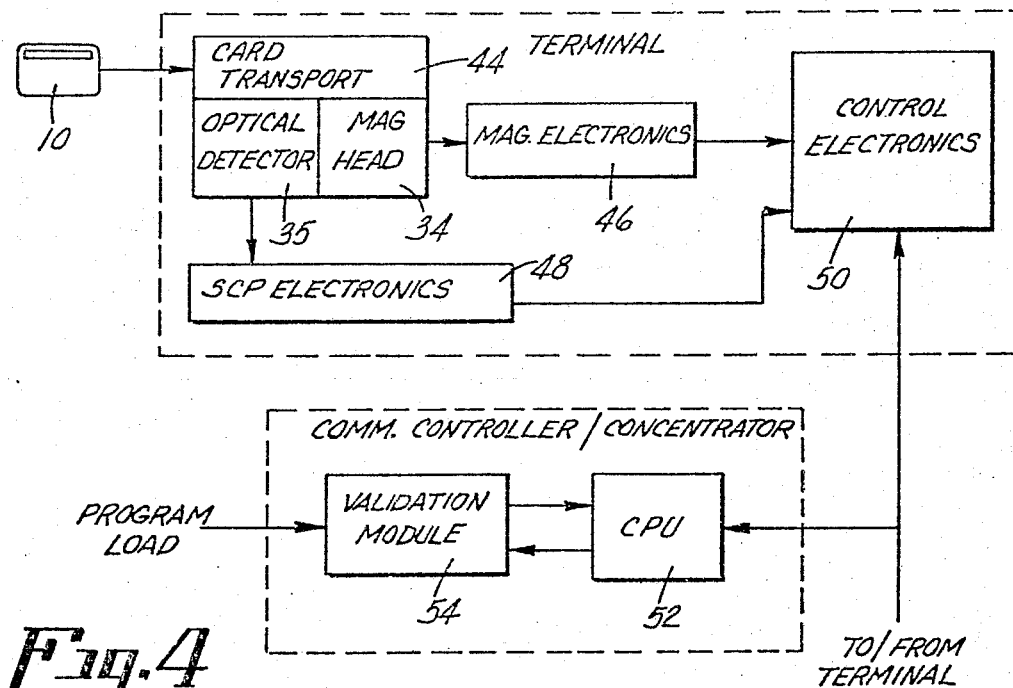
FIG. 4 is a simplified block diagram of the security system of the present invention.

FIG. 4 is a block diagram of the preferred embodiment of the security system of the present invention. The system includes a plurality of remote terminals, one such terminal is generally indicated by the numeral 42 and contains a card transport 44 in conjunction with the above-described magnetic read head 34 and optical detector 35. Signals from the magnetic read head are fed to appropriate circuitry 46, while the optical data signals are received by circuitry indicated by numeral 48. The magnetic and optical data signals are appropriately processed by circuits 46 and 48 before being fed to a control circuit 50, which in turn arranges the data and sends such to a central processing unit (CPU) 52 and associated Validation Module 54.

The Validation Module is appropriately programmed to determine whether or not the presented document is authentic. This determination may be made in many different ways depending upon the nature of the system and the degree of security desired. One such arrangement entails the reading of the magnetic and optical data sets from the card at the time of manufacture and storing data representative of some predetermined spacial relationships between the data sets at the CPU/Validation Module. This data may be stored in accordance with the card's account number or other appropriate identifier. If desired, the spacial relationship data may be encrypted with an encryption algorithm to further enhance the security of the system. When the card is subsequently presented to the system, the magnetic and optical data read at the terminal is processed, encrypted if appropriate, and then compared with the data or code previously stored at the CPU/Validation Module. If the codes compare within predetermined limits acceptable to the system, an approval signal is sent back to the terminal to indicate that the card is authentic. On the other hand, if the generated code or data does not meet the system requirements, a corresponding signal is registered at the terminal, whereby the terminal operator may refuse to accept the card or require additional information before processing the transaction.

Another system arrangement entails recording the encrypted data on the magnetic stripe, as one of the final encoding steps. When such a card is presented, the encrypted data is read as well as the optical and magnetic data sets. The data generated by the data sets is encrypted and compared by a Validation Module. This allows the validation to be carried out without storage of the validation codes (encrypted or otherwise) at a host CPU and local validation modules may be utilized.

Figure 5:
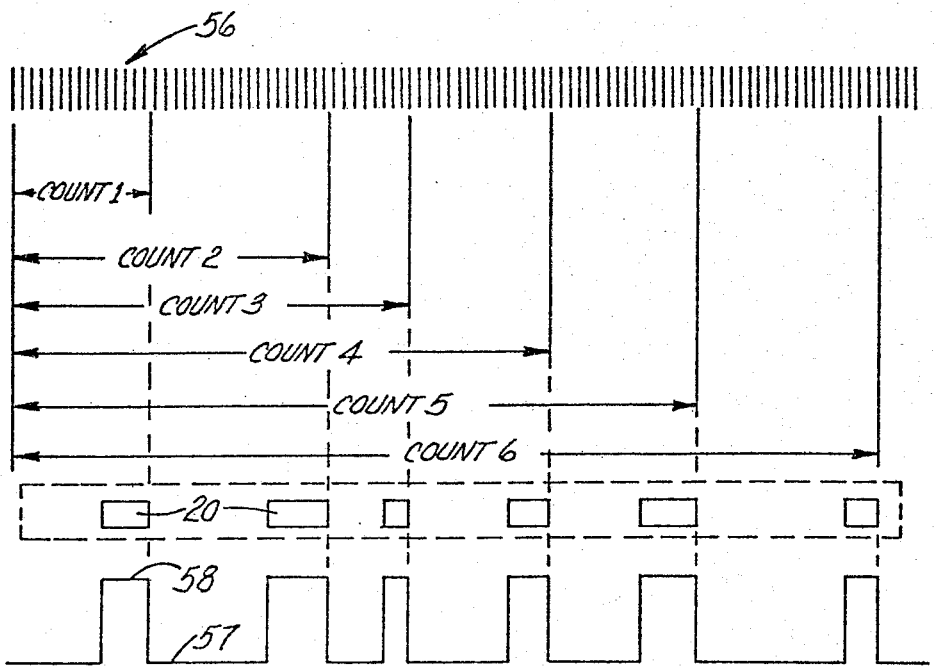
FIG. 5 is a diagram illustrating the relationship between the magnetic and optical data signals provided by the reader illustrated in FIG. 4.

In the preferred embodiment, the circuitry associated with the optical reader keeps track of the trailing edges of the reflective elements and their relationship to flux reversals recorded on one of the magnetic tracks. Such may be on a standard data track, such as TRACK 2, or on a special track provided for the security feature. FIG. 5 is a timing diagram which illustrates this arrangement. The sensed flux reversals from one of the magnetic tracks is generally indicated by the numeral 56 and extends along the entire length of the magnetic stripe, or at least that portion thereof which is coincident with the reflective elements used to generate the optical data sets. As the document is passed beneath the optical detector 35, the intensity of the sensed infrared radiation varies considerably between background areas and reflective areas. The signals generated by sensor 38 in the absence of a reflective element is generally indicated by the numeral 57 and is negligible in strength since a large percentage of the incident radiation is absorbed by the carbon black contained in the underlying shielding layer 28. When a reflective element 20 passes beneath the detector, the resultant signal is increased significantly to a higher level as indicated by the numeral 58. At the trailing edge of the reflective element, the signal drops back to the background level and remains there until the leading edge of the next reflective element is detected. Each detected element provides a resultant signal which is generally square in configuration as illustrated in FIG. 5. Of course, the circuitry may look at either the rising or falling edges or combinations thereof. In actual practice, the leading and trailing edges of each signal will be inclined from the vertical and may even approach a spike configuration. The shape of the signals will be determined to some extent by the nature of the reflective elements, the source of infrared radiation and characteristics of the detector. The number, sizes and position of the elements may be varied during the manufacturing process. The spacing between the magnetic read head and optical detector is set within close tolerances in order to assure proper timing between the generated optical and magnetic signals. It is foreseeable that timing adjustments may be made electronically as well. If desired, the reflective elements may be produced randomly or within controlled limits such that the resultant signal pattern is substantially unique to the particular card.

The circuitry associated with this embodiment of the security system of the present invention keeps track of the trailing edge of each reflector and generally defines its position by the previous magnetic flux reversal count. The circuitry hereinafter described also pinpoints the exact location of each trailing edge signal by recording the effective time interval separating it from the flux reversal. In addition the effective time interval between adjacent flux reversals is recorded. The ratio of the two time intervals may be used to define the relative position of the trailing edge to the preceding and following flux reversals.

When the document is read, the flux reversal count is stored for each trailing edge together with the corresponding time interval data. The terminal compiles a message including a plurality of validation words, preferably corresponding in number to the number of reflective elements. The validation words are processed by validation module which, in effect, compares such with the code previously stored at the module or written in encrypted form onto the card.

Figure 6:
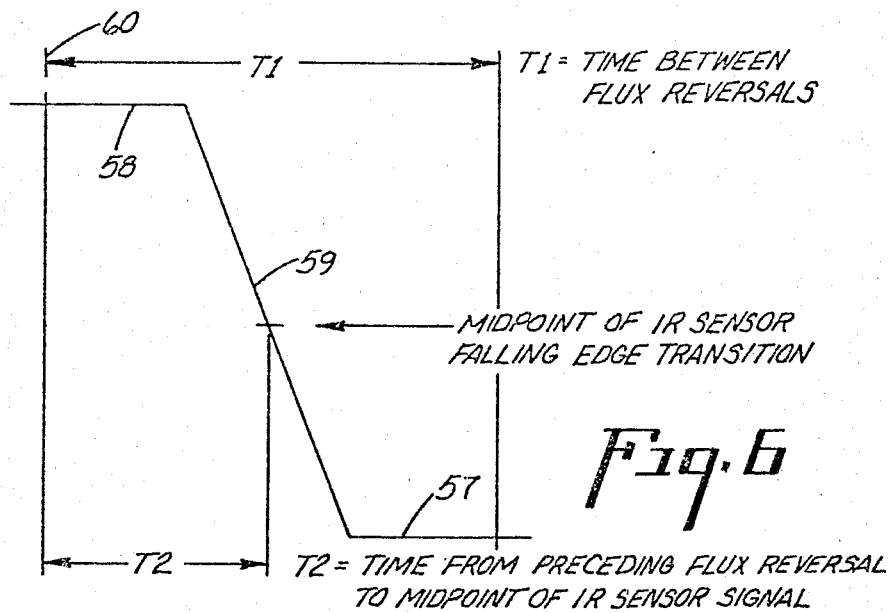
FIG. 6 is a timing diagram illustrating the relationship between the flux reversals and each optical edge illustrated in FIG. 5.

Referring now more particularly, to FIG. 6, the above-mentioned relationship between the flux reversals and trailing edge signal may be seen in more detail. As mentioned above, the trailing edge signals are somewhat sloped as indicated by the numeral 59 rather than perfectly vertical. The effective time interval separating magnetic flux reversals is indicated by T1. The time interval separating the last sensed magnetic flux reversal and the mid-point of trailing edge signal 59 is indicated by T2. It will be appreciated that the relative position of the mid-point of the trailing edge transition to the last sensed flux reversal may be expressed in terms of T1/T2. This ratio together with the count of the previous flux reversal signal defines the position of the trailing edge with a high degree of accuracy. The ratio method also minimizes the adverse effects of speed variations during encoding and reading.

Figure 8:
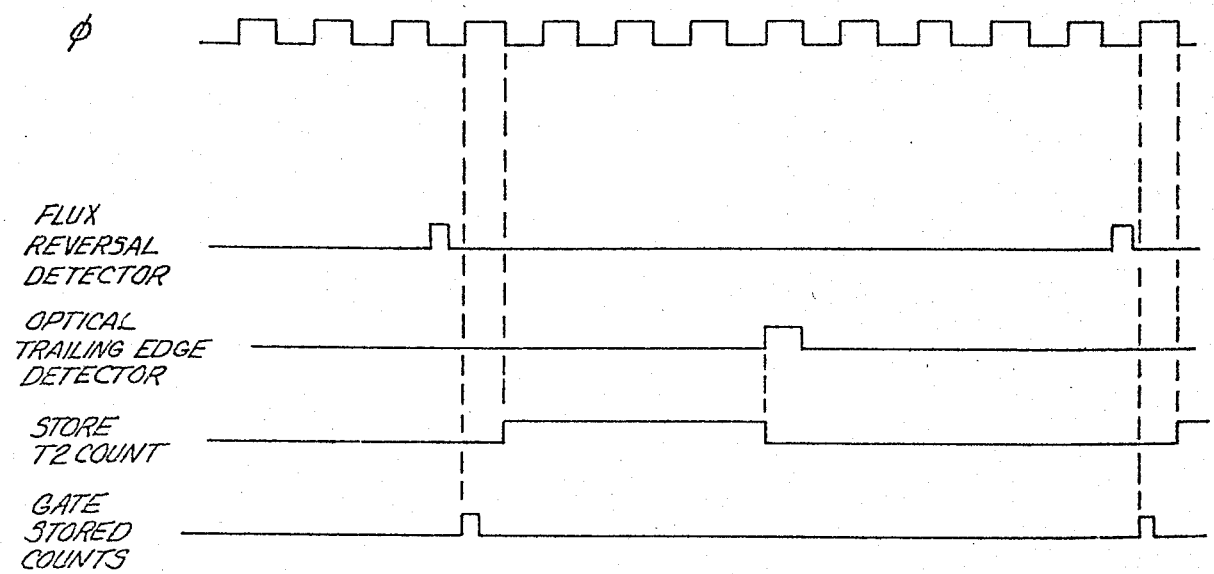
FIG. 8 is a timing diagram associated with the reader circuitry of FIG. 7.
Figure 7:
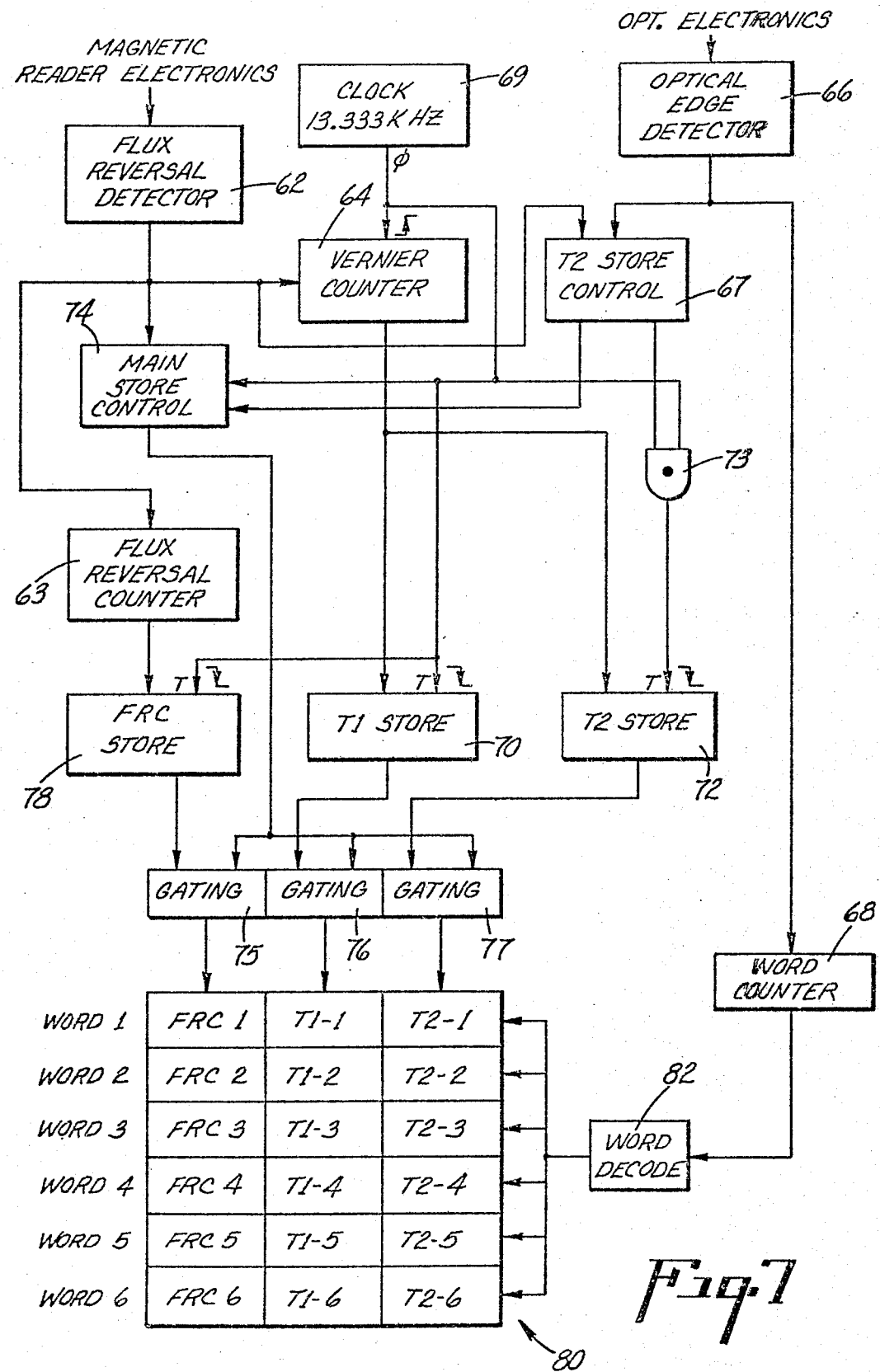
FIG. 7 is a block diagram of the preferred embodiments of secure property reader associated with the present invention.

Referring to FIGS. 7 and 8, the circuitry associated with the present invention and its operation may be more fully understood. The circuitry is provided with a flux reversal detector 62, the output of which is fed to a flux reversal counter 63 and is used to reset a binary vernier counter 64. The output of an optical edge detector 66 is used to enable a T2 store control 67 at the mid-point of each optical trailing edge. Signals from detector 66 are also used to advance a word counter 68 each time a trailing edge is detected.

Timing is provided by an oscillator 69 which generates clock pulse signals $\phi$, preferably of 13.333 KHZ. Under appropriate conditions, this advances a vernier counter 64, the output of which is feed to a T1 count storage buffer 70 under control of the falling edges of the $\phi$ clock pulses. The output of count 64 is also loaded into a T2 count storage buffer 72 under control of the T2 store control 67 which enables gate 73 to pass $\phi$ clock pulses, the falling edges of which cause loading of the T2 count into buffer 72. A second output of the T2 store control also conditions a Main Store Control 74 to operate gating circuit 75, 76 and 77 when the next flux reversal is detected. The flux reversal count of counter 63 is fed to a storage buffer 78 under control of the falling edges of the $\phi$ clock pulses.

The counts stored at 70 and 72 are used to record the T1 and T2 values for each word, while the count stored at 78 is used to record the flux reversal count for each word. A matrix of storage registers, or other memory means, generally indicated by the numeral 80 provides for storage of the flux reversal counts, as well as the T1 and T2 counts. In the example illustrated, registers are provided for the storage of six validation words. Of course, a greater or lesser number may be utilized depending upon the system requirements. Each word includes a flux reversal count (FRC), a T1 count and a T2 count. Thus, there are a total of 18 registers, or an equivalent memory structure such as a layered buffer. The flux reversal count of buffer 78 is entered into the appropriate FRC register through gating means 75. The T1 and T2 counts are entered through appropriate gating means 76 and 77, respectively. The registers to be loaded are selected under control of a word decoder 82 connected to the output of word counter 68.

Basic operation of the circuitry is initiated upon detection of specific flux reversals which are not necessarily the first flux reversals. Preferably, a specific "start" code is written on one of the data tracks. After this code has been read, the first output pulse from detector 62 is effective to reset vernier counter 64 and advance the flux reversal counter 63. Vernier counter 64 is incremented by rising edges of the $\phi$ clock pulses. The count of counter 64 is loaded into buffers 70 and 72 at the falling edge of each $\phi$ clock pulse. The flux reversal count of counter 63 is similarly loaded into buffer 78. When the first optical trailing edge is sensed, the output of detector 66 advanced word counter 68 to the first count, whereby the output of decoder 82 selects the appropriate storage location for the first Validation Word (in this case FRC-1, T1-1, and T2-1). Also, control 67 is enabled, thereby conditioning control 74 and disabling gate 73. This terminates advance of the T2 count stored at buffer 72. The T1 count stored at 70 continues to be incremented until the next flux reversal is sensed through detector 62. This causes control 74 to enable gates 75, 76 and 77 at the next rising edge of a $\phi$ pulse, whereby the counts stored in buffers 78, 70 and 72 are loaded into the proper storage locations in matrix 80. The pulse from detector 62 is also effective to reset vernier counter 64 and reset control 67 to condition such to wait for the next optical edge. In addition, the flux reversal counter 63 is advanced to the next count.

It will be appreciated that if no optical edge is detected after detection of a flux reversal (which is often the case), T2 store control 67 will not be enabled to condition the main store control 74 for operation of gating circuits 75, 76 and 77. Thus, none of the counts stored in buffers 70, 72 and 78 will be stored as a validation word unless an optical edge has been detected. On the other hand, if an optical edge has been detected, Main Store Control 74 is conditioned for operation of gating circuits 75, 76 and 77 when the next flux reversal is detected; such is synchronized with the rising edge of a $\phi$ clock pulse.

In the preferred embodiment, the magnetic flux reversals are spaced apart by a distance of approximately 6.67 mils (for a 1 bit) or 13.33 mils (for a 0 bit). This, together with the high frequency clock pulses, provides a high degree of accuracy of pinpointing the exact location of the trailing edge (or leading edge) of each reflective element. It is not intended that the present invention be limited to the circuitry illustrated in FIG. 7. Various modifications and refinements, such as the addition of time delays to eliminate race conditions, will be readily apparent to those skilled in the art.

When the card is encoded by the application of reflectors in a random manner, the possibility exists that the trailing edge of the first reflector will be coincident in time with a flux reversal. Slight variations in spacing between the magnetic and optical read heads could also cause one terminal to sense such a transition while another would miss the transition. In order to prevent this from occurring, the card encoder may be provided with an IR sensor and associated circuitry to detect an incipient placement of the "start" code within a predetermined tolerance of the first optical trailing edge prior to writing any magnetic information, and to adjust the placement of the magnetic information within necessary tolerances, such as specified by ANSI X4.16–1973. The circuitry may also include means for preventing the storage of erroneous values for T1 and T2 in the event that the mid-point of a detected trailing edge is coincident in time with a detected flux reversal. Under these conditions, 0 values may be stored for both T1 and T2, with the actual value of the flux reversal count being stored at the appropriate Validation Word location.

Figure 9:
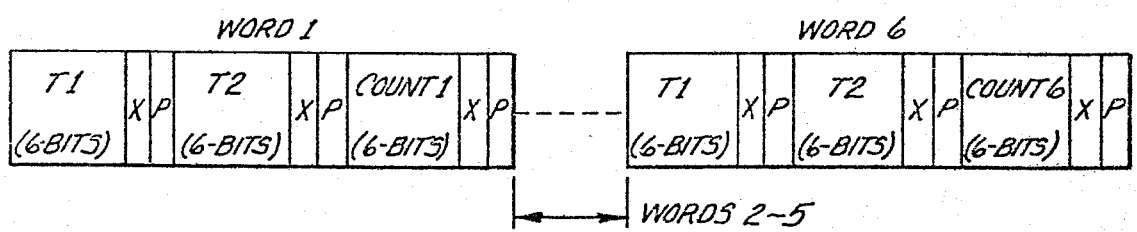
FIG. 9 is an illustration of the typical word structure provided by the reader circuitry illustrated in FIG. 7.

FIG. 9 is an illustration of a typical validation word structure which is compiled at a reading terminal. Preferably, T1, T2 and flux reversal count are each assigned 6 data bits. This is followed by a bit indicated by X which is forced to 1 to avoid ASC II control characters. Each forced bit is followed by a character parity bit P. The validation words are then transmitted as part of an outgoing message to the validation module which in turn carries out one of the above-described validation procedures to determine the authenticity of the presented card. It will be appreciated that each validation word includes three variable parameters. For a counterfeiter to duplicate a card which will produce the same validation word would require a duplication of the reflective element pattern and the exact positioning of such pattern with respect to the magnetic flux reversals. In other words, counterfeiting of the card would require duplication of the optical data set, magnetic data set and proper spacing of the data set on a common card structure within very close tolerances. The magnetic stripe conceals the reflective elements and prevents duplication thereof through the use of reflected visible light or normal photographic means. The shielding layer 28 prevents reproduction of the reflective pattern through techniques attempting to transmit radiant energy through the document. In order to reproduce the reflective pattern within tolerances acceptable to the system would require extensive highly sophisticated equipment and a considerable amount of time and experimentation, to reproduce merely the reflective pattern of a single card. Further experimentation would be required to reproduce the pattern on a card structure and in an orientation which duplicates the spacial relationship to the magnetic flux reversal, which also must be reproduced with a high degree of accuracy on the magnetic stripe of the duplicate card.

Figure 5A:
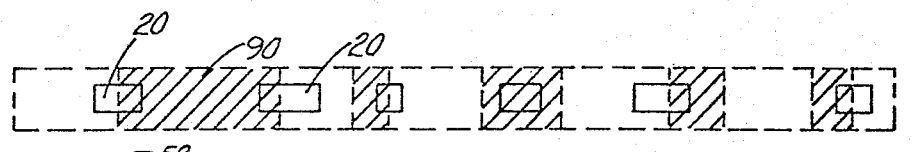
FIG. 5a is a portion of the timing diagram similar to FIG. 5 but associated with a modified embodiment of the secure property of the present invention.

Referring to FIG. 5a an alternate embodiment of the card structure is illustrated which provides an additional security feature to the system. Since the optical detector senses a fairly narrow beam of reflected infrared radiation, the resultant signal strength is influenced to some extent by the optical smoothness of the surface interfacing with the reflective elements. An intermediate or secondary level of reflectivity may be provided by intentionally modifying or deteriorating the optical smoothness of this interface. For example, if the system utilizes the card structure illustrated in FIGS. 1 and 2, the coating 30 may be blurred by physical or chemical means in areas which overlie, or partially coincide with, the reflective elements. Such areas are shown in cross-hatch in FIG. 5a and are indicated by the numeral 90. The partial diffusion in these areas reduces the intensity of radiation sensed by the optical detector. This results in a diminished output signal level such as indicated by numeral 92. Thus, the dual levels of reflectivity produce a resultant signal pattern defining an optical data set containing intermediate signal levels. The system may be appropriately modified to analyze both the high and intermediate levels and execute the validation procedure in accordance therewith. It will be appreciated that this provides an additional security feature which enhances the security of the overall system.

Since the foregoing description and drawings are merely illustrative, the scope of protection of the invention has been more broadly stated in the following claims and it should be liberally interpreted so as to obtain the benefit of all equivalence to which the invention is fairly entitled.

We claim:

1. A secure property for an article in a group of authentic articles for preventing certain alterations or duplication of the article, said secure property comprising:
   at least two sets of data carried by said article, each said data set containing at least one data element which has a spacial relationship to at least one data element of the other data set,
   one of said data sets containing informational data to be rendered secure by said secure property and being substantially different than the data of said other data set,
   said spacial relationship between said data set elements being substantially unique to said article within said group of authentic articles whereby the authenticity of said article may be determined,
   one of said data sets comprising means including a plurality of radiant energy modifying elements for providing data in the form of detectable radiant energy signals in response to irradiation with radiant energy of appropriate characteristics, the other of said data sets comprising magnetic data including a plurality of magnetic flux changes at least some of which are randomly spaced within limits from at least some of said radiant energy modifying elements.

2. The structure set forth in claim 1 wherein said article contains data representative of said spacial relationship.

3. The structure set forth in claim 2 wherein said spacial relationship data is contained in one of said data sets.

4. A secure property for an article in a group of authentic articles for preventing certain alterations or duplication of the article, said secure property comprising:
   at least two sets of data carried by said article, each said data set containing at least one data element which has a special relationship to at least one data element of the other data set,
   one of said data sets containing informational data to be rendered secure by said secure property and being substantially different than the data of said other data set,
   said spacial relationship between said data set elements being substantially unique to said article within said group of authentic articles whereby the authenticity of said article may be determined, said article carrying data representative of said spacial relationship.

5. The structure set forth in claim 3 wherein said spacial relationship data is contained in one of said data sets.

6. The article set forth in claim 4 wherein said data set containing informational data is comprised of magnetic data elements on an erasable magnetic recording medium.

7. The article set forth in claim 6 wherein the other of said data sets contains permanently positioned elements on said article.

8. A security system for determining the authenticity of a presented document of a group of documents containing authentic documents each having at least two sets of data, each said data set containing at least one data element which is spacially related to at least one data element of the other data set, one of said data sets containing informational data to be rendered secure, said system comprising:
means for storing for each authentic document data indicative of the special relation of its data elements,
means for sensing at least some of the data associated with each of said data sets of the presented document,
means for providing signals related to said sensed data and indicative of the spacial relation of said presented document data elements, and
means for effectively comparing said stored spacial relation data for the presented document, if authentic, with said signals, whereby a match within predetermined limits indicates that the presented document is in fact authentic.

9. The security system set forth in claim 8 wherein one of said data sets is comprised of means for providing radiant energy signals detectable by said sensing means in response to irradiation with radiant energy of predetermined characteristics.

10. The security system set forth in claim 9 wherein the other of said data sets is comprised of magnetic data.

11. The security system set forth in claim 10 wherein said means for storing data is carried by the document itself.

12. The security system set forth in claim 10 wherein said means for storing data is comprised of memory means separate from said documents, and further including means for providing identification data associated with the presented document, said comparison means including means for receiving said signals and for receiving spacial relation data from said memory means in accordance with said identification data for the presented document.

13. The security system set forth in claim 12 wherein said informational data includes said identification data.

14. The security system set forth in claim 10 wherein said means for providing radiant energy signals includes at least one radiant energy modifying element carried by said document and positioned in said spacial relationship with said magnetic data element.

15. The security system set forth in claim 14 wherein said other data set includes a plurality of magnetic flux changes and said one data set includes a plurality of said radiant energy modifying elements randomly spaced from each other within limits whereby said special relationship with said magnetic flux reversals is random within limits.

16. The security system set forth in claim 15 wherein said spacial relationship is substantially unique to said document.

17. The security system set forth in claim 16 wherein said radiant energy modifying elements are comprised of a plurality of radiant energy reflectors.

18. A secure property for an article to prevent certain alterations or duplication of the article, said secure property comprising:
at least two sets of data carried by the article, each said data set containing data elements having a spacial relation to data elements of the other data set, said spacial relation being peculiar to the article,
one of said data sets comprising a plurality of radiant energy modifying elements for providing data in the form of detectable radiant energy signals in response to irradiation with radiant energy of predetermined characteristics,
the other of said data sets comprising magnetic data elements comprising a plurality of flux changes,
said magnetic data elements occupying a predetermined area of the article, at least a portion of said radiant energy modifying elements being disposed such that at least a portion of one said data set is superimposed over the other within said predetermined area.

19. The structure set forth in claim 18 wherein said article includes radiant energy shielding means in superimposed relationship with said radiant energy modifying element on one side thereof for substantially obstructing the passage of said radiant energy through said article.

20. The structure set forth in claim 18 wherein said article includes a layer of material which is substantially opaque to visible light and substantially transparent to said radiant energy, said magnetic data being recorded in said layer, said layer substantially concealing said radiant energy modifying elements from detection with visible light.

21. The structure set forth in claim 20 wherein said article further includes radiant energy shielding means in superimposed relation with at least some of said radiant energy modifying elements on one side thereof for substantially obstructing the passage of said radiant energy through said article.

22. A method for preventing use of a counterfeit or altered version of an authentic article, said method comprising:
providing the authentic article with at least two sets of data, one of said data sets containing informational data to be secured, each said data set containing at least one data element which is spacially related to at least one data element of the other data set,
storing data indicative of said spacial relationship for said authentic article,
sensing the data sets of an article presented for use and providing related signals indicative of the spacial relationship of the pertinent data elements contained in the data sets of the presented article, and
comparing said signals of the presented article with said stored spacial relationship data of the authentic article, whereby a match within predetermined limits indicates that the article presented for use is authentic.

23. The method set forth in claim 22 wherein said step of storing data indicative of said spacial relationship for said authentic article comprises recording said data on said article.

24. The method set forth in claim 22 wherein said step of storing data indicative of said spacial relationship for said authentic article comprises storing such data in a memory means separate from said article.

25. The method set forth in claim 22 wherein said informational data includes identification data associated with the authentic article.

26. The method set forth in claim 22 wherein said informational data includes account information associated with the authentic article.

27. A method of preparing an information article for use in a manner to prevent use of a counterfeit or altered version of the article and wherein the article contains security data elements, said method comprising:
recording on the article informational data to be rendered secure, said informational data comprising a plurality of data elements each at a different position on the article,
observing the spacial relations between at least some of said recorded informational data elements and at least some of said security data elements, and
storing spacial relation data for the article indicative of at least some said spacial relation observations.

28. The method set forth in claim 27 wherein said step of recording informational data includes recording identification data associated with the article.

29. The method set forth in claim 27 wherein said security data elements comprise radiant energy modifying elements.

30. The method set forth in claim 27 wherein said step of recording informational data comprises recording flux changes on a magnetic medium carried by the article.

31. The method set forth in claim 30 wherein said step of storing spacial relation data includes recording such data on a magnetic medium carried by the article.

32. The method set forth in claim 30 wherein said step of storing spacial relation data includes storing such data in a memory means separate from the article.

33. The method set forth in claim 30 wherein said security data elements comprise radiant energy reflectors disposed in superimposed relation with said magnetic medium.

34. The method set forth in claim 33 wherein said informational data includes identification data associated with the article.

35. The method set forth in claim 34 wherein said magnetic medium is comprised of a substantially continuous layer of magnetic recording material upon which said flux changes are recorded.

* * * * *

UNITED STATES PATENT AND TRADEMARK OFFICE
CERTIFICATE OF CORRECTION

PATENT NO. : 4,013,894
DATED : March 22, 1977
INVENTOR(S) : Francis C. Foote and Charles K. Beck It is certified that error appears in the above-identified patent and that said Letters Patent are hereby corrected as shown below:

Column 10, line 48, "special" should be deleted and "spacial" substituted therefor; line 60, "3" should be deleted and "4" substituted therefor.

Column 11, line 13, "special" should be deleted and "spacial" substituted therefor; line 59, "special" should be deleted and "spacial" substituted therefor.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*